B. DAY.
FILM APPARATUS.
APPLICATION FILED MAR. 28, 1912.

1,060,892.

Patented May 6, 1913.

B. DAY.
FILM APPARATUS.
APPLICATION FILED MAR. 28, 1912.

1,060,892.

Patented May 6, 1913.

Witnesses:
G. Robert Thomas
D. Harold Rush

Inventor
Benjamin Day
By his Attorney

B. DAY.
FILM APPARATUS.
APPLICATION FILED MAR. 28, 1912.

1,060,892.

Patented May 6, 1913.
4 SHEETS—SHEET 3.

Witnesses:
G. Robert Thomas
D. Harold Rush

Inventor
Benjamin Day
By his Attorney
W. F. Bissing

UNITED STATES PATENT OFFICE.

BENJAMIN DAY, OF SUMMIT, NEW JERSEY, ASSIGNOR TO BEN. DAY, INC., A CORPORATION OF NEW JERSEY.

FILM APPARATUS.

1,060,892. Specification of Letters Patent. Patented May 6, 1913.

Application filed March 28, 1912. Serial No. 686,750.

*To all whom it may concern:*

Be it known that I, BENJAMIN DAY, a citizen of the United States, and a resident of Summit, Union county, New Jersey, have invented certain new and useful Improvements in Film Apparatus, of which the following is a specification.

This invention relates to apparatus for utilizing printing films, for shading the surfaces of drawings, stones, plates and the like. Such apparatus may be embodied in a variety of forms, embodying a suitable base or other form of support, provisions for shifting the film frame to secure rough adjustment with reference to the surface of the work, and mechanism for effecting micrometric or fine adjustment of the film frame. The film carries a pattern formed of dots or lines or both, which, being inked, may be printed by pressure to the surface beneath. By micrometrically adjusting the film frame and film between impressions, many different shading designs may be produced on the plate or stone. To secure these results the film frame is micrometrically adjustable in two directions at right angles to each other, that is to say, forward and backward, or longitudinally and laterally.

The object of this invention is to render the micrometric adjusting mechanism so extremely accurate and reliable that it is possible to reproduce exactly any one of the main different designs obtainable from one film carrying a design, by preserving a record of the degrees through which the several micrometric devices are moved at the various steps in the process. Thus, during the making of a shading design on a printing surface the film in its frame may be micrometrically adjusted in three ways, that is to say, bodily sidewise, bodily forward or backward, or angularly, the last adjustment being effected by moving one of the fore and aft adjusters and not the other, or by moving them in opposite directions, so that the film frame is skewed. By preserving a record indicating which movements are made after the several impressions and the extent of each, if the mechanism be sufficiently accurate any given design may be exactly duplicated at any time.

To these ends the invention comprehends certain effective means for taking up backlash between the parts of the micrometric devices.

Obviously the success with which designs may be reproduced is dependent also upon the security of holding of the various parts which are relatively movable for securing rough adjustment or approximate positioning of the film frame.

Accordingly, a further object of the invention is to provide a superior means for clamping to their shafts or rods the various movable parts or carriages, and, vice-versa, to clamp the various supporting rods and shafts of the machine in their bearings.

A further object of the invention is to provide improved means for locking the pintles pivotally supporting the film frame against the slightest displacement between adjustments.

Still another object is to provide improved guiding means in connection with the fore and aft micrometric adjustments.

Other objects and features of the invention will become apparent as the specification proceeds.

In the accompanying drawings illustrating the invention by means of the preferred embodiments thereof.

Figure 1:
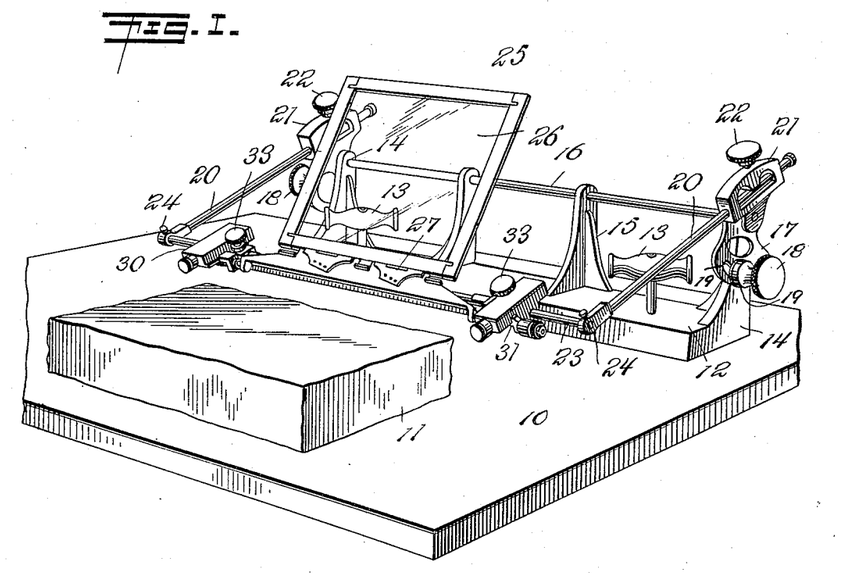
Figure 1 is a perspective view illustrating one type of apparatus in which the improvements may be embodied.
Figure 2:
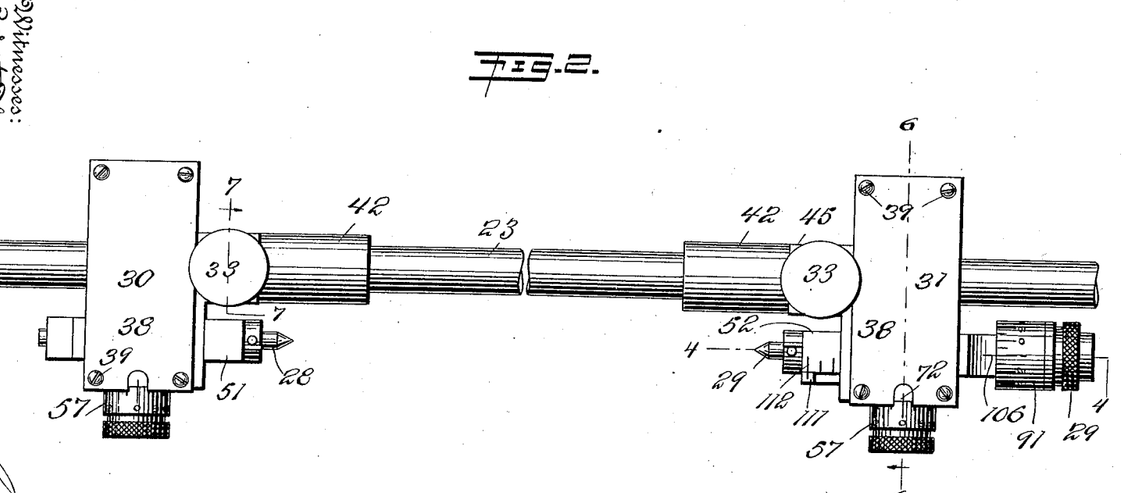
Fig. 2 is a plan view on an enlarged scale of the micrometric adjusting devices mounted on a common transverse rod, the latter being shown broken away because of lack of space.
Figure 3:
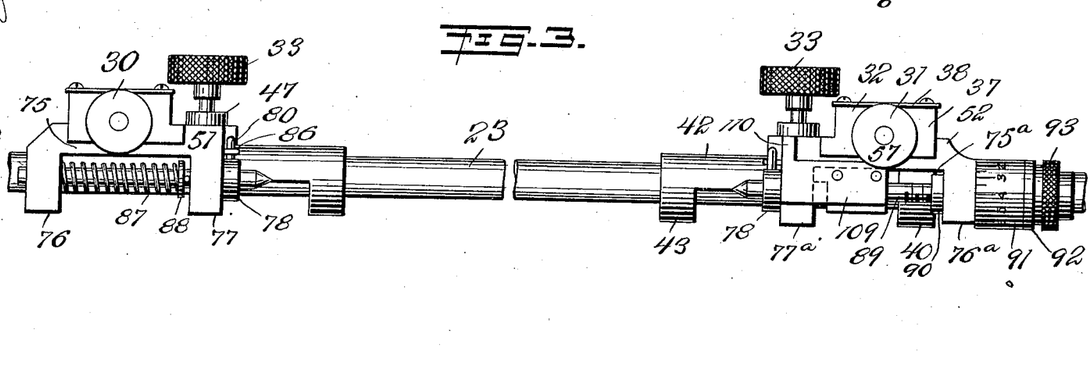
Fig. 3 is a front elevation corresponding to Fig. 2.

For purposes of illustration the invention is shown embodied in what is known as the holdfast type of machine, the same being illustrated more particularly in Fig. 1, but the features of the invention may be embodied equally in other forms of micrometric film frame apparatus.

In Fig. 1 the numeral 10 indicates a table top or suitable work slab, on which are mounted the stone 11 and the base 12 of the holdfast machine. The stone and the holdfast may be moved about as desired. The base of the holdfast is shown as provided with handles 13 for the purpose of lifting it. End standards 14 and intermediate standards 15 project upward from the base 12 and carry a rotatable transverse supporting rod 16 at their upper ends. On the ends of this rod outside the standards 14 are fixed pivotal supports 17. These two pivoted supports may be clamped or locked at any degree of angular adjustment, as by means of a set screw 18, which is threaded into one of the standards 14, its shank passing through an arcuate slot 19 in the depending portion of the corresponding support 17, and the screw being further provided with a shoulder portion which bears against the outer side of said pivotal support. Longitudinal rods 20 are carried by these pivotal supports 17, and are slidably adjustable forward and backward with reference thereto. To this end they are mounted slidably in bearings in suitable holders 21, constituting the upper portions of the supports 17. Set screws 22 threaded into these holders 21 and bearing at their ends against the rods 20 serve to clamp the latter in their bearings. A transverse rod 23 fixed rigidly to the forward ends of the rods 20 by set screws 24 may constitute the support on which the micrometric devices are mounted. By the foregoing arrangements, the film frame may be moved back and forth and up and down to the approximate position desired. The devices for pivotally supporting and micrometrically adjusting the film frame may also be movable longitudinally on the rod 23 to secure rough lateral adjustment of the film frame.

The film frame is indicated at 25, and the film carried by it is numbered 26. For purposes of clearer illustration the latter is shown more transparent than it actually is. The film frame may be held in any suitable form of clamp or holder 27. This holder or clamp is pivoted, so that the film in its frame may be swung up from time to time for inspection of the work. For this purpose the said clamp or holder is hinged at the rear corners of the frame on spaced pintles 28 and 29, which are preferably conically pointed to be received in suitable sockets in the said clamp.

Figure 7:
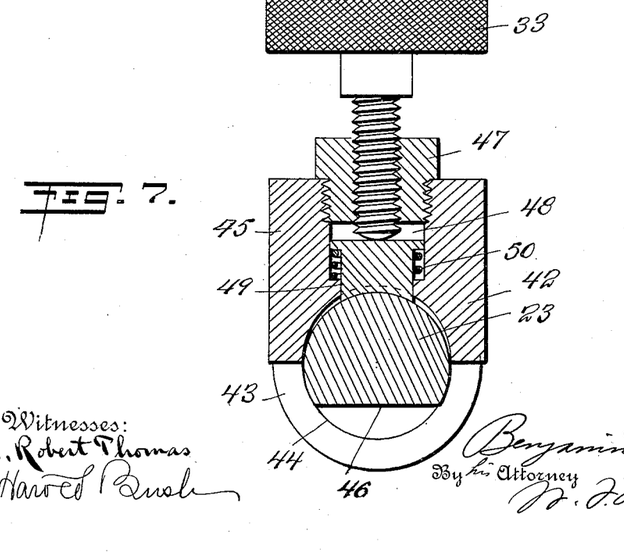
Fig. 7 is an enlarged vertical section on the line 7—7 of Fig. 2.

The form and arrangement of the micrometric devices may be varied. Preferably they consist of two compound devices, designated as a whole by the numerals 30 and 31. These devices are similar in many of their features, and except where otherwise indicated it will be understood that description of parts in one applies to the other also. In the particular construction illustrated each of these devices includes a support or carriage 32 mounted on the rod 23, so as to be capable of being shifted both longitudinally and relatively thereon, set screws 33 being provided for holding the carriages rigid when positioned as desired. The carriages 32 are preferably in the form of boxes, open at the bottom and elongated transversely of the rod 23. They are shown as comprising side walls 34 and 35, a back wall 36, and a front wall 37. The top of this box-like structure is preferably covered by a plate 38 secured thereto by screws 39. The side wall 34 has a downward extension 40 having a circular bearing opening 41, which receives the transverse rod 23. The other side wall 35 has a semi-tubular extension 42, at the end of which is a collar portion 43, affording another circular bearing opening 44 in alinement with the opening 41. The set screws 33 have threaded connection with portions 45 formed on the carriages 32 at the inner ends of the semitubular extensions 42 from the side wall 35. The screw is thus located approximately midway between the bearing openings 41 and 44, and serves to force the shaft 23 against the bottoms of these bearing openings, or rather, to draw the bearing portions 40 and 43 up against the bottom of the shaft. One of the features of the invention relates to the provision of clamping means of superior efficacy at this and other similar points in the film frame apparatus. Reference may be had more particularly to Fig. 7. For the purpose of effecting this secure and absolutely rigid holding the cylindrical rod 23 is flattened or slabbed at one side as indicated at 46. Preferably this flattening cuts away approximately one-third of the circumference of the rod, and in the present instance the cut-away portion is located at the bottom of the rod. Obviously, the region 46 need not be flat all the way across, the end to be attained being the provision of spaced corners on the rod adapted to engage after the manner of a circular wedge with the walls of the circular or cylindrical bearing openings 41 and 44. The said bearing openings are of somewhat larger diameter than the cylindrical diameter of the rod 23. The set screw 33 is located opposite the flattened or mutilated side of the rod 23, and preferably midway between the sides thereof. The said set screw may engage directly with the carriage portion 45 and bear at its end directly against the rod 23, but preferably it is threaded into a plug 47, which in turn is screwed into a vertical cylindrical opening 48 in the portion 45, and the lower end of the screw bears against a plunger or block 49, having its bottom cylindrically concaved to fit the contour of the rod 23. A spring 50 may be interposed between a flange on the top of the block 49 and the bottom of the recess 48, to raise this bearing block when the screw 33 is moved upward. By means of this construction the carriages may be clamped with exceeding rigidity, and without injury to the bearings and rod, yet, when the screws 33 are loosened, they may be slid or rotated on the rod 23 with perfect freedom.

Figure 4:
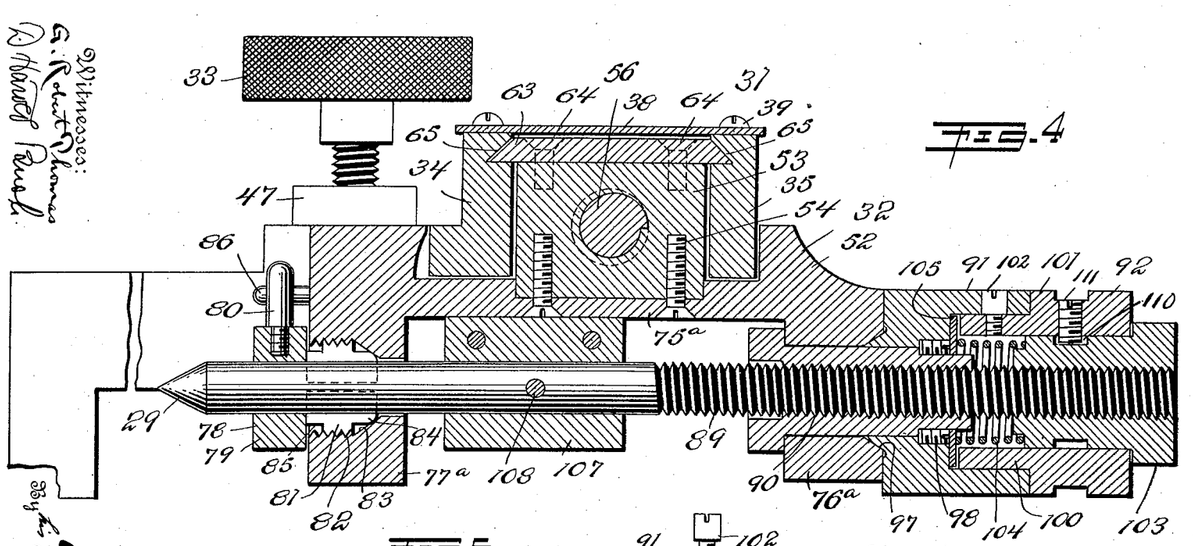
Fig. 4 is a vertical section on the line 4—4 of Fig. 2, the parts 90 being shown on a considerably enlarged scale for greater clearness.
Figure 6:
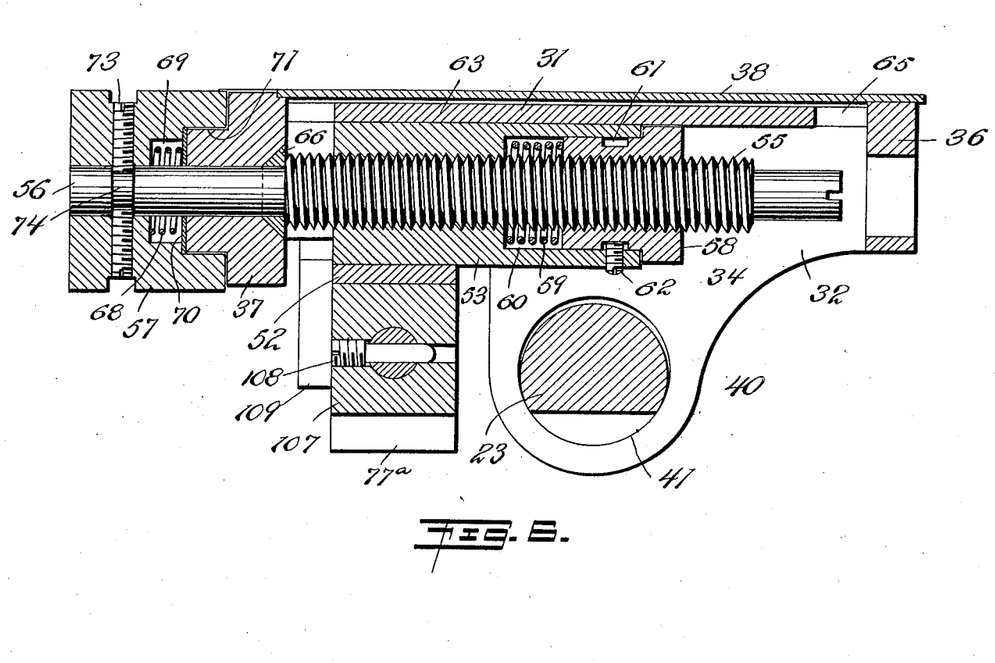
Fig. 6 is an enlarged vertical section on the line 6—6 of Fig. 2.

The pintles 28 and 29 are mounted in pintle holders 51 and 52, which are supported by and movable forward and backward on the carriages 32. The means for effecting this fore and aft or longitudinal micrometric adjustment will now be described. These provisions may be, and preferably are, identical for both pintles. Reference will be had more particularly to Figs. 6 and 4. A nut block or member 53 is located inside of the box-like structure afforded by the carriage 32, and is guided for longitudinal movement only. To its underside, at the front, is secured the top wall of the pintle holder 51 or 52 as the case may be, screws 54, shown in Fig. 4, being used for this purpose. The nut block 53 is operated by the screw-threaded portion 55 of an operating shaft 56, on the front end of which, outside of the front wall 37 of the carriage 42, is secured a graduated operating head or barrow 57. For the purpose of taking up backlash a second nut member 58 is provided, the two nut devices 53 and 58 being connected together in such a manner as to be free to be urged in opposite directions by a spring 59, which is interposed between the members and is under compression, so as to tend to urge the nuts away from each other. Thus, the outwardly facing walls of the threads of the nut devices are pressed against the inward facing walls of the threads on the shaft, thereby constantly and automatically taking up any backlash that may exist or that may arise. Suitable means are provided for tensioning the spring 59. In the preferred construction illustrated the nut member 53 is provided in its rear portion with a cylindrical chamber 60, which is open at the rear end and into which the cylindrical nut device or plug 58 is inserted, and within which it is movable, the spring 59 being housed in the forward part of the same chamber. In assembling, this internally threaded plug, 58, is screwed along the threads of the shaft into the nut block 53, on entering which it compresses the spring 59 previously placed therein. The power of this spring is gaged to perform the work it has to do, namely to thrust the nut members apart against the threads of the shaft, thus not only taking up all lost motion in an easily revoluble screw structure but also compensating for all wear in the threads of the nuts or shaft.

A connection is provided between the nuts permitting sufficient relative axial movement thereof to take up back-lash and compensate for wear and coupling them as to rotation. Since the nut block 53 is guided so as to be incapable of turning, the coupling also holds the nut plug 58 against rotation. The coupling as to rotation may be either loose or tight, that is, the nut plug 58 may be held by the connection against all turning or a limited degree of turning relatively to the nut block 53 may be permitted. In the illustrative construction shown the latter is the case. The nut plug 58 is shown as provided with a peripheral annular groove 61 receiving a radial screw 62 which is threaded through the wall of the chambered part of the nut block 53. This screw does not bear against the bottom of the groove 61, and its portion entering the nut plug 58 is of less diameter than the width of said groove, so that the nut members are connected loosely as far as relative axial movement is concerned.

When the operating shaft 56 is turned in one direction its threads positively and directly propel the nut block 53 to the rear by virtue of the sides of the threads which are held in close contact by the thrust of the spring. The nut plug 58 may not partake of this axial movement of the nut block 53 at once, turning instead with the screw 55, until the rear side of the screw 62 contacts with the rear wall of the groove 61. Then the nut plug 61 is coupled to the nut block 53 against rotation and the nut members remain at a fixed distance. On reversing the rotations of the threaded shaft, if there be any lost motion between the threads of the shaft and of the nut block 53, the said nut block will not be propelled directly by the threads of the shaft acting on its threads. Instead the threads of the shaft let the nut block 53 off, and the block is propelled forward by the pressure of the compressed spring, which acts against the nut plug 58 as an abutment carried by the shaft. During this condition the said nut plug may be rotating with the shaft without moving directly. This condition lasts only until the forward side of the screw 62 contacts with the front wall of the groove 61, when the nut plug 58 is coupled to the nut block 53 against rotation and the two nut members preserve a fixed distance. Thereafter the propulsion of the nut block 53 may be regarded as effected by the screw shaft through the nut plug 58 and the spring 59. At no time is there any lost motion. It will be seen that the nut members remain at practically fixed distances, so that the spring acts always with substantially uniform force to take up back-lash to compensate for wear. The slight elongation or shortening of the spring due to slight variations in the distance between the nuts as described above does not materially affect its tension. As a matter of fact the nut members may be coupled as to rotation so that no relative rotary movement thereof is permitted in which case the nuts will always remain at absolutely fixed distances, except as wear may gradually allow them to move apart to an almost infinitesimal degree.

The invention is by no means limited to the form of connection comprising the peripheral groove 61 and the screw 62, this connection being selected largely because it is easy to make. Any connection which couples the nuts as to rotation while leaving them free to be urged in opposite axial directions against the threads of the screw will suffice.

The nut device 53, and consequently the pintle holder 51 or 52 are reliably guided as to their longitudinal movement by means of a separately formed plate 63, which is secured to the top of the nut block 53 as by means of screws 64. The side edges of this plate are beveled, as shown in Fig. 4, and are received in correspondingly beveled guide grooves 65 in the side walls 34 and 35 of the carriage 32. The length of the beveled guide edges of the plate 63 is several times as great as the extent of possible movement of the nut block 53 and its pintle holder. By being formed separately the plate 53 may have its beveled side edges made with great exactitude to fit the guideways 65, and moreover the plate may be considerably longer than the nut block 53, so that all possibility of side binding or gagging is eliminated. The sole guiding as to forward and backward movement is at the edges of the plate 63. At all other regions clearance is afforded between the nut block 53 and the pintle holder (51 or 52) on the one hand and the carriage 32 on the other hand. The nut block 53 and the pintle holder depend from the plate 63 as a guiding support.

The threaded portion 55 of the shaft 56 terminates at the inner side of the front wall 37 of the carriage 32. In advance of this point the said shaft is smooth and of reduced diameter, and passes through a cylindrical bearing opening in the said front wall 37. A thrust bearing is provided at the inner side of the wall 37, preferably by means of a cone washer 66, against which bears the shoulder afforded at the front end of the threaded portion 55 of the shaft, and which in turn bears against a conical recess in the wall 37. A spring 68 is employed for holding the shaft against this thrust bearing, thereby taking up any lost motion that might otherwise exist between the shaft and the stationary wall 37. The micrometer barrel 57 is preferably hollow, and the spring 68 is housed in the chamber 69 formed therein. The said spring bears at one end against the bottom of this chamber and at the other end against a washer 70, which in turn bears against the outer side of the wall 37. The wall 37 may have a cylindrical boss or extension 71 received in the rim or flange of the barrel 57. The spring 68 serves to relieve any friction which might otherwise exist between the micrometer barrel and the front side of the wall 37.

Means are provided whereby the micrometer barrel 57 may be angularly adjusted on the shaft 56, so as to position the zero mark on the barrel accurately with reference to the index mark 72 formed on top of the wall 37. To this end radial set screws 73 are preferably provided, the same being threaded into the micrometer barrel 57 and bearing at their inner ends against the bottom of an annular groove 74 formed in the shaft. On loosening of these set screws the micrometer barrel may be turned relatively to the shaft, and when the two parts are in proper relation the screws may be set so as to unite them rigidly.

The pintle holders 51 and 52 may be, and preferably are, of similar construction. As shown, they are devices elongated transversely of the carriages 32 and parallel to the rod or shaft 23, being constructed so as to be attached to the nut blocks 53 and to present spaced bearings for guiding the pintles 28 and 29 in their endwise movement. Accordingly, each pintle holder may have an elongated top wall 75 or 75$^a$, the top of which may be provided with a shallow recess in which the nut block 53 is seated. The screws 54 secure this top wall solidly to the nut block as already described. The pintle holders are further provided at their ends with depending walls or bearing portions 76 or 76$^a$ and 77 or 77$^a$. The two depending walls 76 and 77 or 76$^a$ and 77$^a$ of each pintle holder are provided with alined openings through which passes the pintle 28 or 29 or its extension.

In accordance with the invention both pintle holders are provided with removable bearings constructed to center and clamp the pintles. The preferred form of these devices is shown at 78, the same being applied to the inner end walls 77 and 77$^a$ of the two pintle holders. These removable bearings are identical for both pintle holders, and the construction of the right-hand removable bearing is shown on an enlarged scale in Fig. 4. As there illustrated the device comprises a head 79 with a radial handle 80, and a split sleeve portion 81 received in a socket in the wall 77$^a$ (or 77). This sleeve or clamping portion has an external screw threaded portion 82, which engages with corresponding internal threads in said socket. The inner end of the socket terminates in inclined walls 83, and the corresponding end of the removable bearing is rounded as shown at 84. The sleeve portion 81 is divided by any suitable number of slots into sections so as to be compressible and expansible. An arrangement of four slots is indicated. The screw threaded portions are preferably cylindrical, the clamping of the bearing against the pintle being effected solely by the riding of the rounded nose portion 84 on the inclined surfaces 83. To improve the action the sleeve portion 81 is provided with a circumferential annular groove 85 where it joins the head 79. A stop pin 86 arranged to contact with the handle 80, but not to obstruct the operation thereof, serves to prevent loss of the removable bearings 78.

The left-hand pintle 28 is unthreaded and slides in its removable bearing 78 in a bearing opening formed in the depending wall 76 of its pintle holder. It is pressed forward by a light spring 87, which is coiled about the pintle between the walls 76 and a washer 88 which abuts against a transverse pin passed through the pintle.

Figure 5:
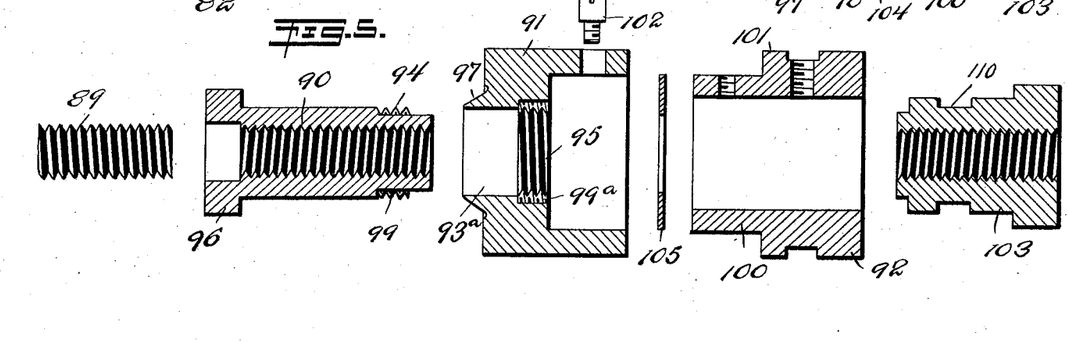
Fig. 5 is a disassembled view of the parts shown at the right of Fig. 4.

In the preferred arrangement the micrometric means for adjusting the film frame operates in conjunction with the pintles such as already described. As shown, this adjusting means is applied to the right-hand pintle 29, but of course it adjusts both pintles, since advancing the pintle 29 causes the pintle 28 to recede because the film frame 25 and its holder 27 are interposed between the pintles as a thrust connection, while retraction of the pintle 29 causes the pintle 28 to advance an equal amount by reason of the spring 87, the two pintles always being spaced at the same distance by the interposed film frame holder 27. In this construction, then, the right-hand pintle 29 has a screw-threaded extension 89, which, together with the nut member or members, constitutes the means for micrometrically adjusting the pintle. As in the case of the forward and backward adjustment two coupled nut members are mounted on this screw threaded shaft 89. In this instance, however, the shaft 89 moves longitudinally but is held against turning, while the nut devices are rotated, one or both being the operating part of the device. The preferred construction is illustrated in detail in Figs. 4 and 5. The opening in the outer wall 76ª of the pintle holder is considerably larger than the diameter of the pintle or its threaded extension 89, in order to accommodate a nut member 90, one portion of which is an internally threaded sleeve, the outer cylindrical surface of which is journaled in this bearing opening. This nut member is shown as composed of several parts. In addition to the internally threaded sleeve 90 there is a hollow cylindrical member 91 which bears the graduations, and another hollow cylindrical section 92, which has a knurled surface 93 for manual operation. The micrometer barrel 91 is apertured as shown at 93ª in Fig. 5, to receive the end portion of the sleeve 90. The said parts 90 and 91 are provided with coöperating screw threads 94 and 95, enabling them to be drawn together, until a head or flange 96 on the nut sleeve 90 contacts with the inner face of the wall 76ª and the barrel 91 bears against the outer face of this same wall. The part 91 is provided with a conical bearing portion 97 which coöperates with a corresponding bearing recess in the outer side of the wall 76ª. In this way all lost motion between the nut member and the stationary part 76ª in which it is journaled may be taken up. When the desired closeness of fit is secured the parts 90 and 91 are rigidly fixed together by means of screws 98 which are threaded into tapped openings formed half in the part 90 and half in the part 91, as indicated at 99, 99ª in Fig. 5. The outer portion of the part 91 is chambered, and into this chamber is fitted the reduced portion 100 of the tubular part 92, said part being provided with a shoulder 101 which abuts against the end or rim of the parts 90, 91 and 92 constitute, in effect, one together by one or more radial screws 102, or any other suitable manner. Thus, the parts 90, 91 and 92 constitute, in effect, one nut member, which has an internally threaded portion engaging the screw-threaded shaft 89, and a chambered outer portion. It may be regarded as a cylindrical chambered operating head. For the purpose of taking up all backlash between the screw-threaded parts of the micrometric adjustment, a second nut member 103 is provided, and a spring 104 is interposed between the nut members, which are coupled together in such manner as to permit them to be urged by the spring against the threads of the shaft. In the particular construction shown the nut member 103 is in the nature of a cylindrical plug, which is inserted by screwing it onto the threaded pintle shaft into the cylindrical chamber of the compound operating head or nut member. The spring 104 is housed in the same chamber, under compression, and bears at opposite ends against the nut plug 103 and a washer 105, which is placed at the base of the said chamber over the heads of the screws 98.

The operation of the two nut members and the spring 104 is, in general, similar to that of the nut members and spring in the fore and aft adjustment already described. In this instance the shaft 89 moves longitudinally and does not turn, while the nut members are the rotatable elements. The operating nut member 90, 91, 92 is held against axial movement by its connection with the pintle holder. The nut plug 92 is coupled to the operating nut member to rotate therewith. As before the coupling may be tight as to relative rotation or loose as to rotation so as to allow a certain degree of independence between the nuts as to turning. The latter construction is shown as a satisfactory and inexpensive embodiment. The nut plug 103 is provided with an annular groove 110 in its periphery, which receives a radial screw 111 threaded into the parts 92. The relation between the groove and screw is as before. When the operating nut member 90, 91, 92 is turned in one direction its threads positively and directly propel the pintle to the left. The nut plug 103 may not partake of the rotation of the operating nut member immediately, but instead may move longitudinally with the threaded shaft which carries it until the rear wall of the groove 110 contacts with the rear side of the screw 111, when the two nut members are coupled and rotate together at a fixed distance apart. When the operating nut member is rotated in the opposite direction to cause the pintle to move to the right, if there be lost motion, it may not propel the pintle directly. Instead it lets off the pintle which is urged to the right by the compressed spring 104 acting against the nut plug 103 as an abutment on the shaft, the nut plug, not rotating for this brief period. As soon, however, as the front wall of the groove 110 contacts with the front side of the screw 111 the nut members are coupled as to rotation and preserve a fixed distance. At no time can lost motion occur. The backlash take-up means, as before, acts with substantially uniform force at all times, because the distance between the nut members is not materially altered. The connection may be such that the distance is not altered at all except gradually and infinitesimally by wear.

The graduations on the micrometer barrel 91 coöperate with the index mark 106 formed on the relatively stationary top wall of the pintle holder 52.

The right-hand pintle 29 is held against turning by means of a block 107 located between the wall 76ª and 77ª of the corresponding pintle holder and having a flat top surface which contacts with the flat underside of the top wall 75ª of said holder. This block is provided with a longitudinal opening receiving the pintle, to which it may be secured by a transverse pin or screw 108. To the front side of this guide block is secured a guide and index plate 109, which slides with its rear vertical face against the front vertical faces of the pintle holder 52, so as to further guide the pintle 29 in its rectilinear movement. At the inner end this plate 109 is provided with an upstanding portion 110, which bears an index mark 111 coöperating with other index marks 112 on the top surface of the projecting portion of the wall 75ª of the pintle holder 52.

In operation, the film frame may be micrometrically adjusted straight forward or straight backward, without skewing or rotatably shifting, by turning the two micrometer barrels 57 to the same extent and in the same direction. This rotates the threaded shafts 55, thereby moving the nut blocks 53 forward or backward as the case may be, thus moving the pintle holders 51 and 52 which are carried by the said nut blocks. In this way the pintles 28 and 29 are moved sidewise relatively to the rod 23 or other support. One only of the forward and backward adjusters may be operated, or the two may be adjusted to different extents, or in opposite directions. In any of these cases the film frame may be given an angular adjustment, so that the lines or rows of dots on the printing film are displaced angularly with reference to their normal positions. To adjust the parallel frame micrometrically in sidewise directions the knurled portion 93 is turned, thereby rotating the compound nut structure consisting of the parts 90, 91 and 92, and, these parts being held against longitudinal movement, the screw 89 and with it the pintle 29 are propelled longitudinally, the pintle 28 partaking of the same movement as already described. When the sidewise adjustment is being effected the clamping bearings 78 of the pintles are loosened, and when the desired lateral adjustment has been secured they are tightened again to centralize the pintles and insure against accidental displacement until the time arises for the next adjustment. While these devices hold the pintles firmly against accidental displacement, however slight, the clasping of the smooth surfaces of the bearings against the smooth sides of the pintles is not so tight that the pintles cannot be moved by the threaded operating nut and shaft parts without injury to the latter. Thus there is no danger of injuring the mechanism by the operator forgetting to loosen the bearing devices 78 before effecting a sidewise adjustment. All of the micrometric adjustments, by virtue of the anti-backlash provisions, may be effected with almost absolute accuracy, with the result that any formula for the production of a given design may be followed at any time with identical results.

What is claimed as new is:

1. Micrometric apparatus for pivotally holding and micrometrically adjusting a printing film frame, comprising, in combination, a pintle holder, a pintle slidable endwise in said pintle holder, one end of said pintle being screw-threaded, a micrometric screw-threaded sleeve for adjusting said pintle longitudinally, a one piece removable screw-threaded centralizing bearing in said pintle holder encircling said pintle, and a fixed screw-threaded socket for circularly compressing said bearing to clamp the pintle.

2. Micrometric apparatus for pivotally holding and micrometrically adjusting a printing film frame, comprising, in combination, a pintle holder having an internally-threaded and tapered socket, a slotted centralizing bearing with external screw threads engaged in and adapted to be compressed by said socket, a handle on said bearing, a pintle slidable and clampable in said bearing, and micrometric means for adjusting said pintle longitudinally.

3. Micrometric apparatus for pivotally holding and micrometrically adjusting a printing film frame, comprising, in combination, a pintle holder having a socket with a threaded outer portion and a plain tapered inner portion, a centralizing bearing engaged in said socket, having a head or collar at its outer end, a longitudinally slotted and externally-threaded sleeve portion, an annular groove at the junction of said sleeve portion with the head, and a rounded end coöperating with said tapered portion of the socket, a pintle slidable and clampable in said bearing, and micrometric means for adjusting said pintle longitudinally.

4. In a micrometric apparatus for holding and adjusting printing film frames, in combination with a base and a pintle, mechanism for micrometrically adjusting said pintle relatively to the base comprising a screw-threaded shaft and a nut member thereon, and means acting with substantially uniform force to take up back-lash between said screw-threaded shaft and nut member.

5. In a micrometric apparatus for holding and adjusting printing film frames, in combination with a base and a pintle, mechanism for micrometrically adjusting said pintle relatively to the base comprising a screw-threaded shaft and a nut member thereon, a second nut member on the shaft, and a spring for taking up back-lash interposed between said nut members.

6. In a micrometric apparatus for holding and adjusting printing film frames, in combination with a base and a pintle, mechanism for micrometrically adjusting said pintle relatively to the base and taking up back-lash, comprising a screw-threaded shaft, nut members thereon, a loose connection between said nut members, and a spring interposed between said nut members.

7. In a micrometric apparatus for holding and adjusting printing film frames, in combination with a base and a pintle, mechanism for micrometrically adjusting said pintle relatively to the base and taking up back-lash, comprising a screw-threaded shaft, a chambered nut member thereon, a second nut member engaging the screw-threaded shaft, said second nut member being received inside the chambered member, means coupling the nut members and permitting relative longitudinal movement, and a spring interposed between said members.

8. In a micrometric apparatus for holding and adjusting printing film frames, in combination with a base and a pintle, mechanism for micrometrically adjusting said pintle relatively to the base and taking up back-lash, comprising a screw-threaded shaft, a nut member thereon, means for turning one of these parts and means for guiding the other, a second nut member on the shaft, one of said nut members being received inside the other and having a lateral recess and said other member having an inward-projecting screw entering said recess and having play therein longitudinally of said shaft, and a spring interposed between said nut members.

9. In a micrometric apparatus for holding and adjusting printing film frames, in combination with a base and a pintle, mechanism for micrometrically adjusting said pintle relatively to the base and taking up back-lash, comprising a screw-threaded shaft, a nut member thereon, means for turning one of these parts and means for guiding the other, a second nut member on the shaft, one of said nut members having an annular groove and the other having a screw entering said groove and having lateral play therein, and a spring interposed between said nut members, said second nut member being adapted to be rotatively coupled to the first by engagement of said screw against the side of said groove.

10. In a micrometric apparatus for holding and adjusting printing film frames, the combination of a pintle holder, a pintle slidable therein and having a threaded extension, graduated operating means including a rotatable operating nut member on the threaded extension of the pintle, a second nut member thereon, means coupling said nut members together, and a spring interposed between said nut members and pressing them apart.

11. In a micrometric apparatus for holding and adjusting printing film frames, the combination of a pintle holder, a slidable pintle therein having a threaded extension, an operating nut engaging said threaded extension and held to said pintle holder against axial movement, a back-lash take-up nut also engaging said threaded extension and coupled to said operating nut, and a back-lash take-up spring interposed between said nuts.

12. In a micrometric apparatus for holding and adjusting printing film frames, the combination of a pintle holder having a bearing opening, an internally-threaded operating member having a cylindrical sleeve portion rotatable in said bearing and parts contacting the side walls of said holder at opposite ends of the bearing opening, and a pintle slidably guided in the pintle holder and having a threaded extension engaging the internal screw thread of said operating member.

13. In a micrometric apparatus for holding and adjusting printing film frames, the combination of a pintle holder having a bearing opening, an internally-threaded operating member having a cylindrical sleeve portion rotatable in said bearing and parts contacting the side walls of said holder at opposite ends of the bearing opening, a pintle slidably guided in the pintle holder and having a threaded extension engaging the internal screw thread of said operating member, a second internally threaded member on the threaded extension of said pintle, means coupling said internally threaded members together, and a spring interposed between said members.

14. In a micrometric apparatus for holding and adjusting printing film frames, the combination of a pintle holder having a bearing portion containing a bearing opening, an operating device comprising an internally-threaded sleeve journaled in said bearing and having an enlargement at one side of said bearing portion, a barrel fixed on said sleeve and bearing against the opposite side of said bearing portion, and a thimble partially received in and fixed to said barrel, a pintle slidably guided on said pintle holder and having a threaded extension passing through said device and engaging the threads of the sleeve part thereof, an internally-threaded plug received in said thimble and engaging the threaded extension of the pintle, a radial screw coupling said thimble and plug and permitting relative longitudinal movement thereof, and a spring housed inside the thimble and barrel and bearing at opposite ends against the operating device and plug.

15. In a micrometric apparatus for holding and adjusting printing film frames, the combination of a pintle holder, a pintle slidably guided in said pintle holder and having a screw threaded extension, a rotary chambered structure comprising two internally-threaded members engaging the threaded extension of the pintle and coupled as to rotation with freedom of relative axial movement, and a spring housed in said chambered structure and pressing said members apart against the threads of the pintle extension.

16. In a micrometric apparatus for holding and adjusting printing film frames, the combination of a support, a rotary shaft journaled in said support and having a screw-threaded portion, a pintle holder slidably guided on said support and having a nut portion engaging the screw-threaded portion of said shaft, another nut member engaging said threaded shaft portion, means coupling said nut portion and nut member, and a spring interposed between said nut portion and nut member.

17. In a micrometric apparatus for holding and adjusting printing film frames, the combination of a support, a rotary shaft journaled in said support and having a screw-threaded portion, a pintle holder slidably guided on said support and having a chambered nut portion engaging the screw-threaded portion of said shaft, an internally-threaded back-lash take-up plug inserted in the chamber of said nut portion and coupled to said nut portion, and a spring housed in said chambered nut portion and urging said nut portion and plug in opposite directions against the threads of the shaft.

18. In a micrometric apparatus for holding and adjusting printing film frames, the combination with a support and a device for holding a printing film frame, of micrometric means for adjusting said device relatively to said support comprising a threaded shaft journaled in said support, a nut member on said shaft, and a long plate fixed to the top of said member and having projecting beveled side edges, said support having beveled slide-ways accurately receiving said beveled edges.

19. In a micrometric apparatus for holding and adjusting printing film frames, the combination of a support, a pintle holder spaced therefrom and having a nut portion, a separate guiding plate secured to the top of said pintle holder and accurately guided on said support, and a shaft journaled in said support and having a threaded portion engaging said nut portion.

20. In a micrometric apparatus for holding and adjusting printing film frames, the combination of a support, a pintle holder mounted slidably thereon and having a nut portion, a screw-threaded operating shaft engaging with the internal threads of said nut portion and journaled in a bearing in a wall of said supporting part, said shaft having a thrust bearing against the back of said wall, an operating head secured to said shaft in front of said wall, and a spring interposed between said wall and said head.

21. In a micrometric apparatus for holding and adjusting printing film frames, the combination of a support, a pintle holder mounted slidably thereon and having a nut portion, a screw threaded operating shaft engaging with the internal threads of said nut portion and journaled in a bearing in a wall of said supporting part, said shaft having a thrust bearing against the back of said wall, an operating barrel secured to said shaft in front of said wall, and a spring housed in said barrel and compressed between the barrel and wall.

22. In a micrometric apparatus for holding and adjusting printing film frames, the combination with pivotal supports for a film frame and micrometric adjusting devices for the same, of means for supporting said pivotal supports and adjusting devices including a cylindrical rod having a flattened surface, a part having a circular bearing of greater diameter receiving the rod, and a set screw which forces the edges of the flattened portion of the rod against the walls of said opening.

23. In a micrometric film frame apparatus, the combination of a pintle holder, a pintle slidable therein, micrometric means for adjusting the pintle longitudinally, a guide block fixed to the pintle, and a guide plate secured to said block and bearing against the side of the pintle holder and having an upward-projecting index portion.

In testimony whereof, I have signed my name to this specification, in the presence of two subscribing witnesses.

BENJAMIN DAY.

Witnesses:
D. HAROLD BUSH,
W. F. BISSING.

Copies of this patent may be obtained for five cents each, by addressing the "Commissioner of Patents, Washington, D. C."